United States Patent [19]

Nosek

[11] Patent Number: 4,967,483

[45] Date of Patent: Nov. 6, 1990

[54] HIT PIN FOR WHEELED MEASURING DEVICE AND METHOD OF ASSEMBLY THEREFOR

[76] Inventor: Frank J. Nosek, 1236 Whitingham Cir., Napersville, Ill. 60566

[21] Appl. No.: 431,399

[22] Filed: Nov. 3, 1989

[51] Int. Cl.$^5$ .............................................. G01B 3/12
[52] U.S. Cl. ........................................ 33/779; 33/772
[58] Field of Search ................ 33/772, 775, 778, 779, 33/780, 781, 782; 235/95 R, 95 B; 152/427, 429

[56] References Cited

U.S. PATENT DOCUMENTS

| | | | |
|---|---|---|---|
| 2,123,360 | 7/1938 | Harris | 235/95 R |
| 2,513,817 | 7/1950 | Pennington | 152/429 |
| 2,817,906 | 12/1957 | Hall | 33/772 |
| 3,251,132 | 5/1966 | Hall | 235/95 R |
| 3,432,095 | 3/1969 | Jones | 33/772 |
| 3,442,316 | 5/1969 | McMaster | 152/427 |
| 3,673,693 | 7/1972 | Evans, Jr. | 235/95 R |

FOREIGN PATENT DOCUMENTS 2347860 12/1977 France .................. 235/95 R

Primary Examiner—William A. Cuchlinski, Jr.
Assistant Examiner—D. Price
Attorney, Agent, or Firm—Wood, Phillips, Mason, Recktenwald & VanSanten

[57] ABSTRACT

A wheel is provided for a measuring device of the type having a frame, a distance counter having an actuating lever thereon and mounted on the frame, and structure for mounting the wheel on the frame for rotation about an axis. The wheel has an annular surface for engaging and rolling against a surface along which a distance is to be measured, first and second annular side walls spaced axially with respect to the wheel axis and connected to the annular rolling surface with each side wall having a thickness in an axial direction, a hit pin, and structure for securing the hit pin to the wheel so that a part of the hit pin projects axially from one of the side walls to engage and operate the actuating lever on the counter as an incident of the wheel rotating relative to the frame.

20 Claims, 1 Drawing Sheet

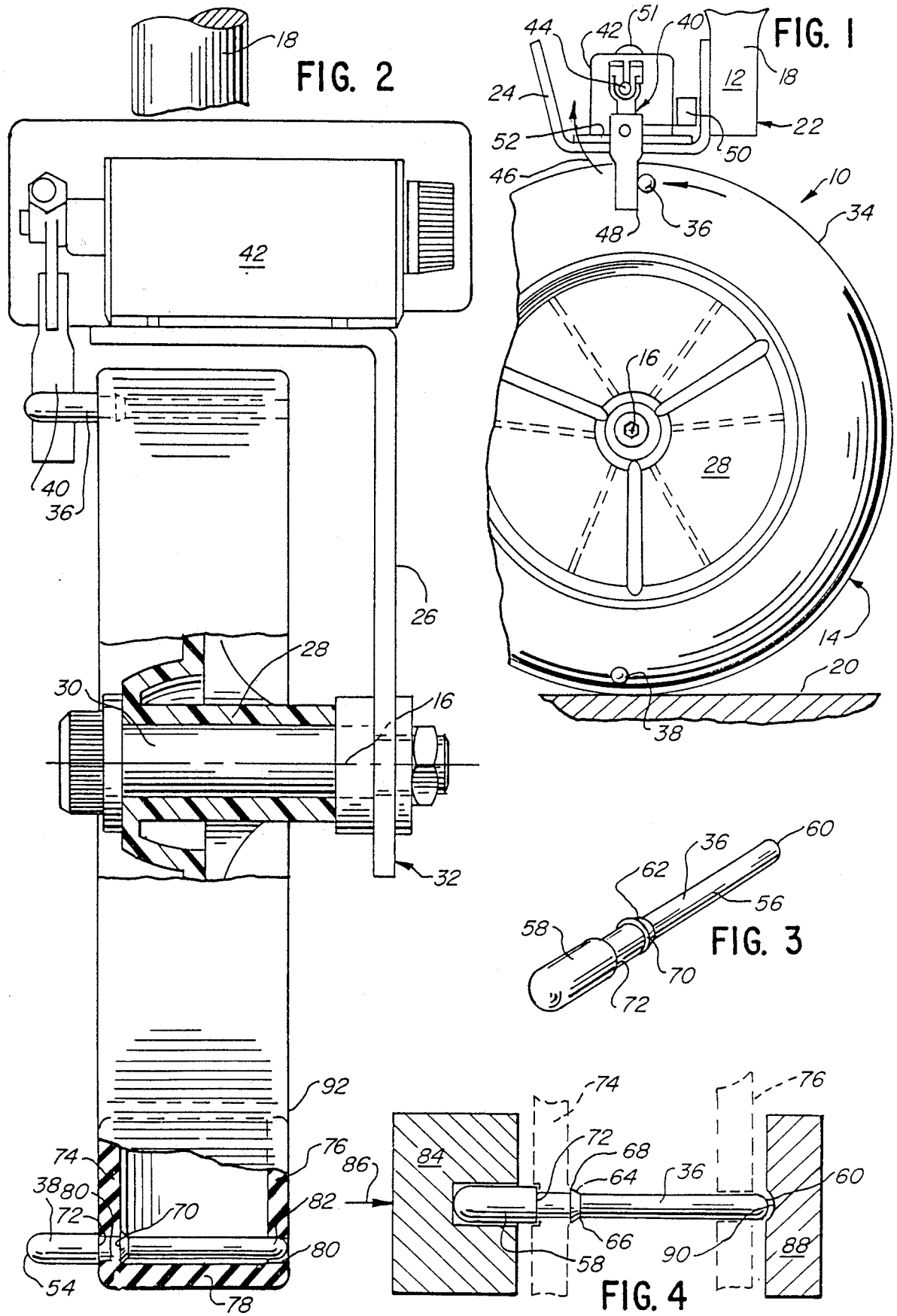

HIT PIN FOR WHEELED MEASURING DEVICE AND METHOD OF ASSEMBLY THEREFOR

BACKGROUND OF THE INVENTION

1. Field of the Invention

This invention relates to distance measuring devices and, more particularly, to a wheeled distance measuring device with an associated counter that is actuated by a hit pin on the wheel as the wheel rolls along a surface on which a measurement is to be taken.

2. Background Art

Wheeled distance measuring devices are known in the art. It is conventional on such devices to rotatably mount a wheel on a frame that has an integral elongate handle to facilitate control thereof by an operator. The operator uses the handle to roll the wheel against a surface to be measured. As the wheel rotates, a hit pin engages a movable lever arm on a counter to pivot the lever arm and thereby record an increment of distance each time the hit pin moves against the lever arm. The counter has a visual display to indicate to the user the distance traversed by the wheel.

One typical counter mechanism has a lever arm which is pivotable between first and second positions and normally biased into the first position. As the wheel rotates, the hit pin engages the lever arm, effects movement of the lever arm from its first position to its second position, to thereby cause an incremental distance to be recorded on the counter, and then moves past the lever arm so that the lever arm is free to pivot under the bias force back to its first position.

It is important, for the above device to operate effectively, that the hit pin, upon each wheel revolution, engage and consistently move the lever arm from its first position to its second position. This requires that the hit pin be firmly implanted in the wheel. The wheels on such measuring devices are conventionally made from a deformable, high-friction, rubber material, which does not lend itself to the rigid attachment of hit pins. It is common with conventional structures for the hit pins, after repeated use, to become dislodged from the wheel. If the hit pin separates altogether from the wheel, the entire device is inoperable. If the hit pin becomes loose, it is possible that there may be sufficient play in the hit pin that it moves past the lever arm without effecting a required movement of the lever arm to record an increment of distance.

Typically, wheeled measuring devices are designed so that the wheel rotates in only one direction in use. Opposite rotation of the wheel causes the hit pin to jam against the lever arm in its first position until the wheel rotation is arrested. This jamming action can cause the hit pin to break off. This jamming action may also cause the opening through the wheel, which accepts the hit pin, to enlarge, thereby making it unusable for accepting a substitute hit pin.

It is also conventional to make the measuring wheels hollow with spaced annular side walls. Conventional hit pins have normally been directed through only one side wall. As a result, those in the art have contended with two vexatious problems: (1) that of the pin sliding lengthwise in and out of the opening through the side wall; and (2) that of the pin position varying due to the inherent flexibility of the annular wheel side wall.

SUMMARY OF THE INVENTION

The present invention is specifically directed to overcoming the above enumerated problems in a novel and simple manner.

According to the invention, a wheel is provided for a measuring device of the type having a frame, a distance counter having an actuating lever thereon and mounted on the frame, and structure for mounting the wheel on the frame for rotation about an axis. The wheel has an annular surface for engaging and rolling against a surface along which a distance is to be measured, first and second annular side walls spaced axially with respect to the wheel axis and connected to the annular rolling surface with each side wall having a thickness in an axial direction, a hit pin, and structure for securing the hit pin to the wheel so that a part of the hit pin projects axially from one of the side walls to engage and operate the actuating lever on the counter as an incident of the wheel rotating relative to the frame.

The hit pin preferably has an elongate body. The securing structure for the hit pin includes a first enlargement on the body defining a first shoulder facing lengthwise of the body in a first direction and a second enlargement on the body defining a second shoulder facing oppositely to the first direction. With the hit pin in its operative position, one of the wheel side walls is firmly captively maintained between the first and second shoulders. This limits axial movement of the hit pin from its assembled, operative position.

The invention also contemplates limiting movement of the hit pin in other than an axial direction relative to the wheel. To accomplish this, the hit pin extends fully through the one wheel side wall and into the other wheel side wall. This arrangement firmly anchors the pin to maintain its axial alignment with the wheel.

In a preferred form, the pin body has a cylindrical configuration. A radially enlarged bead has a ramp surface which tapers progressively from one axial end thereof, having a diameter equal to that of the cylindrical body, to a larger diameter at the other axial end of the ramp surface at which the first shoulder is defined. The ramp surface on the bead progressively deforms the wheel during assembly and thereby allows passage of the first shoulder through the one side wall. Once the ramp surface passes fully through the one side wall, the wall assumes its undeformed state and the opening constricts.

Preferably, the second enlargement, defining the second shoulder, is an enlarged diameter head which is exposed at one axial side of the wheel with the hit pin in its operative position. The head coacts with the lever arm on the counter and moves the lever arm to operate the counter.

To facilitate passage of the hit pin into its operative position, the end thereof, remote from the enlarged head, has a taper and preferably a rounded configuration. This rounded configuration smoothly leads the hit pin through the one side wall and into the other side wall.

To facilitate assembly of the hit pin, the hit pin is preferably made from a low friction material. In a preferred form, the hit pit is made from plastic material, such as nylon, and can be coated with TEFLON ® to facilitate its assembly.

The present invention also is directed to a method of assembling a hit pin, such as that described above.

To effect assembly, an axial hole is bored into the one annular side wall and preferably at least partially into the other side wall. The pin is then pressed through the opening in the one side wall until the annular bead extends fully through the opening in the one side wall so that the one side wall is captively maintained between the first and second shoulders. Simultaneously, the pin end, remote from the head, moves into the opening in the other side wall. Axial movement is limited by a backing element against which the leading pin end abuts during assembly. The backing element has a recess, such as a dimple, to allow the pin end to be extended slightly axially beyond the other side wall. Once the axially directed assembly force is removed from the pin, the wheel side walls spring back so that the leading pin end is substantially flush with the outer surface of the other side wall.

BRIEF DESCRIPTION OF THE DRAWINGS

FIG. 1 is a fragmentary, side elevation view of a wheeled measuring device having actuating hit pins, according to the present invention, assembled thereon;

FIG. 2 is an enlarged, end elevation view of the wheeled measuring device in FIG. 1;

FIG. 3 is an enlarged perspective view of one of the hit pins on the measuring device of FIGS. 1 and 2; and FIG. 4 is a schematic representation of a mechanism for assembling the hit pin of FIG. 3.

DETAILED DESCRIPTION OF THE DRAWINGS

A wheeled measuring device, according to the present invention, is shown at 10 in FIG. 1 and consists of a frame 12, to which a wheel 14 is mounted for rotation about an axis 16.

The frame 12 consists of an elongate, tubular handle 18, which is sufficiently long to allow a user in an upright position to conveniently grip the handle 18 and effect rolling of the wheel 14 against a subjacent surface 20 along which a distance is to be measured. The lower end 22 of the handle 18 has a counter support bracket 24, from which an integrally formed leg 26 depends. A hub 28 on the wheel 14 is secured, as through a bolt 30, to the lower end 32 of the bracket 24 for rotation.

In operation, the user grasps the handle 18 and rolls the peripheral surface 34 of the wheel 14 firmly against the subjacent surface 20 on which a measurement is to be taken. As the wheel 14 is rotated, diametrically opposite hit pins 36, 38, extending axially from adjacent the radially outer portion of the wheel 14, cooperate with a lever arm 40 on a counter 42 to record an increment of distance upon each pin 36, 38 engaging and moving the lever arm 40 from the FIG. 1 position, pivotably about an axis 44 in the direction of arrow 46 to a second position, wherein the hit pin 36 can rotate past the end 48 of the lever arm 40. Each time the lever arm 40 moves from its first position to its second position, an increment of distance is recorded on the counter 42. A spring bias mechanism, shown schematically at 50, pivots the lever arm 40 from the second position to the first position once the hit pin 36 has cleared the lever arm end 48. The counter accumulates the increments each time the pins 36, 38 move the lever arm 40, and a display 50 allows the user to get a visual indication of the cumulative recorded distance.

The exact details of the counter 42 need not be known to understand the present invention. It suffices to say that the counter 42 is rigidly mounted on a bottom wall 52 of the bracket 24. The hit pins 36, 38 must move the lever arm 40 through a complete stroke for an increment of distance to be recorded on the counter 42. If, for any reason, the hit pins 36, 38 become loosened, the counter 42 may not operate properly.

There are two main problems that conventionally cause the hit pin 36, 38 to change position and thereby malfunction. First, the counter 42 has a mechanism which blocks the lever arm 40 in its FIG. 1 position. If the wheel 14 is rotated in a clockwise direction in FIG. 1 about axis 16, the hit pins 36, 38 will jam against the lever arm 40 in its fixed, FIG. 1 position. As this occurs, the pins 36, 38 may sever or be skewed from their preferred axial alignment with the wheel pivot axis 16. This may cause the pin receiving openings in the wheel 14 to enlarge, resulting in the hit pins 36, 38 falling out of or having an undesirable amount of play in their operative position.

Another problem is that there may be a tendency of the assembled pins 36, 38 to move axially relative to the wheel 14. For example, it is common for the user to abruptly lay the device 10 down and thereby drop the device 10 on the head 54 of the pins 36, 38. The pins 36, 38 resultingly tend to move axially toward the frame leg 26. The pins 36, 38 might be moved axially, from left to right in FIG. 2, sufficiently that the exposed portion of the pin 36, 38 on the left hand side of the wheel in FIG. 2, does not project axially far enough to engage the lever arm 40.

The present invention is concerned with the configuration of the hit pins 36, 38, as well as a method of assembling the same. Since the hit pins 36, 38 are the same, the description herein will be limited to exemplary hit pin 36.

The hit pin 36 consists of an elongate, cylindrical, body 56 with an enlarged head 58, at one end thereof, and a rounded nose 60 at the end remote from the head 58. Between the head 58 and nose 60 is a radially enlarged bead 62 having a tapered ramp surface 64. The surface 64 has a diameter substantially equal to that of the body 36 at one axial end 66 thereof, and progressively increases in diameter towards the other axial end 68 of the surface 64. A first annular shoulder 70 is defined adjacent the bead end 68 and faces in a first axial direction. The head 58 defines an axially oppositely facing second shoulder 72.

The pin 36 is intended to be used with a wheel 14 of the type shown in FIGS. 1 and 2. The wheel 14 has a hollow construction with spaced annular side walls 74, 76, interconnected by an annular rolling wall 78. The walls 74, 76, 78 are preferably made from a deformable, high friction rubber material.

The thickness of the side walls 74, 76 is chosen so that, with the pin 36 in its operative position in FIGS. 1 and 2, the one side wall 74 is firmly, captively maintained between the first and second pin shoulders 70, 72, respectively.

To effect assembly of the pin, a bore 80, having a diameter slightly less than the diameter of the body 36, is made in the wheel side walls 74, 76, parallel to the axis 16 and adjacent to the wall 78. The nose 60 of the pin 36 is forced through the bore 80. As the bead 62 encounters the side wall 74, the tapered surface 64 progressively wedges the wheel side wall 74 to effectively enlarge the bore 80 until the bead 62 can pass entirely through the side wall 74. Once the bead 62 is passed through the wall 74, the material in the wall 74 springs back to closely frictionally grip the pin body 36 between the first and second shoulders 70, 72. At the same time, the wall 74 is firmly, captively maintained between the shoulders 70, 72 on the pin 36.

To further rigidify the connection of the pin 36 and wheel 14, the pin 36 is made sufficiently long that, in its assembled position, it will extend into the bore 80 in the wall 76. The pin end 82 extending into the wall 76 is frictionally gripped thereby.

Resultingly, the pin 36 is securely fixed against both axial and transverse movement relative to the wheel 14. Because the pin 36 is located adjacent the wall 78, the wheel 14 thereadjacent is relatively rigid to afford a firm foundation for the pin 36.

FIG. 4 schematically depicts a preferred mechanism for assembling the pin 36. At a first station, bores 80 are simultaneously drilled at diametrically opposite positions on the wheel 14 to accept the pins 36, 38. The wheel 14 is then directed to a pin assembly station, shown in FIG. 4. At the assembly station of FIG. 4, a ram 84, holding the pins 36, 38, is used to drive the pins 36, 38 through the bores 80. A predetermined force is applied, through a conventional mechanism, in the direction of arrow 86 i.e. lengthwise of the pin 36 and axially of the wheel 14. A backing die 88 has dimples 90 (one shown) to accommodate the noses 60 of the pins 36, 38. The dimples 90 allow the pins 36, 38 to be forced by the ram 84 fully through and slightly axially beyond the outer surface 92 of wall 76. As this occurs, the shoulder 72 deforms the side wall 74 axially toward the right in FIG. 4. Once the ram pressure is released, the wall 74 will assume its undeformed state, whereupon the nose 60 backs slightly axially towards the left to be flush with the surface 92 of the side wall 76.

The resulting connection between the pins 36, 38 and wheel 14 is thus rigidly maintained. Preferably, the pins 36, 38 are made from a plastic material, to facilitate manufacture by molding. The pins can have a TEFLON® coating to facilitate their advance through the wheel side walls 74, 76.

The foregoing disclosure of specific embodiments is intended to be illustrative of the broad concepts comprehended by the invention.

I claim:

1. A wheel for a measuring device of the type having a frame, a distance counter having an actuating lever and mounted on the frame, and means for mounting the wheel on the frame for rotation above an axis, said wheel comprising:
    an annular surface for engaging and rolling against a surface along which a distance is to be measured;
    first and second annular side walls spaced axially with respect to the wheel axis and connected to said annular surface, each said side wall having a thickness in an axial direction;
    a hit pin; and
    means for securing the hit pin to the wheel so that a part of said hit pin projects axially from one of said side walls to engage and operate the actuating lever on a counter as an incident of said wheel rotating relative to the frame,
    said hit pin having an elongate body,
    said securing means including a first enlargement on said body defining a first shoulder facing lengthwise of said body in a first direction and a second enlargement on said body defining a second shoulder facing oppositely to said first direction,
    one said wheel side wall being captively maintained between the first and second shoulder with the pin secured to the wheel in an operative position to thereby prevent shifting of the hit pin axially with respect to the wheel,
    said hit pin extending fully through each said first and second side walls.

2. A wheel for a measuring device of the type having a frame, a distance counter having an actuating lever and mounted on the frame, and means for mounting the wheel on the frame for rotation above an axis, said wheel comprising:
    an annular surface for engaging and rolling against a surface along which a distance is to be measured;
    first and second annular side walls spaced axially with respect to the wheel axis and connected to said annular surface, each said side wall having a thickness in an axial direction;
    a hit pin; and
    means for securing the hit pin to the wheel so that a part of said hit pin projects axially from one of said side walls to engage and operate the actuating lever on a counter as an incident of said wheel rotating relative to the frame,
    said hit pin having an elongate body,
    said securing means including a first enlargement on said body defining a first shoulder facing lengthwise of said body in a first direction and a second enlargement on said body defining a second shoulder facing oppositely to said first direction,
    one said wheel side wall being captively maintained between the first and second shoulders with the pin secured to the wheel in an operative position to thereby prevent shifting of the hit pin axially with respect to the wheel,
    wherein said hit pin has an end remote from said hit pin part that extends into the other wheel side wall.

3. The wheel for a measuring device according to claim 2 wherein said first enlargement comprises an annular bead with a non-constant diameter.

4. The wheel for a measuring device according to claim 2 wherein said first enlargement comprises an annular bead with a tapered ramp surface that guides movement of said annular bead through said one wheel side wall.

5. The wheel for a measuring device according to claim 2 wherein said hit pin is made from plastic.

6. A wheel for a measuring device of the type having a frame, a distance counter having an actuating lever and mounted on the frame, and means for mounting the wheel on the frame for rotation above an axis, said wheel comprising:
    an annular surface for engaging and rolling against a surface along which a distance is to be measured;
    first and second annular side walls spaced axially with respect to the wheel axis and connected to said annular surface, each said side wall having a thickness in an axial direction;
    a hit pin; and
    means for securing the hit pin to the wheel so that a part of said hit pin projects axially from one of said side walls to engage and operate the actuating lever on a counter as an incident of said wheel rotating relative to the frame,
    said hit pin having an elongate body,
    said securing means including a first enlargement on said body defining a first shoulder facing lengthwise of said body in a first direction and a second enlargement on said body defining a second shoulder facing oppositely to said first direction, one said wheel side wall being captively maintained between the first and second shoulders with the pin secured to the wheel in an operative position to thereby prevent shifting of the hit pin axially with respect to the wheel, wherein said second enlargement comprises an enlarged head on one end of said elongate body.

7. The wheel for a measuring device according to claim 2 wherein the hit pin end remote from the hit pin part has a tapered configuration to facilitate guided movement thereof through the one wheel side wall and into the other wheel side wall.

8. The wheel for a measuring device according to claim 2 wherein the hit pin end remote from the hit pin part has a rounded nose to facilitate guided movement thereof through the one wheel side wall and into the other wheel side wall.

9. A hit pin for a wheel on a measuring device of the type having a frame, a distance counter having an actuating lever and mounted on the frame, and means for mounting the wheel on the frame for rotation about an axis, said wheel having an annular surface for engaging and rolling against a surface along which a distance is to be measured and first and second annular side walls each having a thickness, said hit pin comprising:

an elongate body;

a first enlargement on the body and having a first shoulder facing lengthwise of the body in a first direction; and a second enlargement on said body defining a second shoulder facing oppositely to said first direction, said first enlargement comprising an annular bead with a tapered ramp surface to guide movement of the annular bead through a wheel side wall so that a wheel side wall through which the annular bead is extended can be captively maintained between the first and second shoulders, wherein the elongate body has a cylindrical configuration with a first substantially uniform diameter, wherein the ramp surface has at one axial end thereof a diameter substantially equal to said first diameter and the diameter of the ramp surface increases progressively from said one axial end to the other axial end of the ramp surface.

10. The hit pin according to claim 9 wherein said second enlargement comprises an enlarged head on an end of said hit pin to be exposed for engagement with an actuating lever on a counter with the hit pin in operative position on a wheel.

11. The hit pin according to claim 10 wherein the end of the pin remote from said head has a rounded configuration to facilitate passage through side walls of a wheel.

12. The hit pin according to claim 11 wherein said hit pin is made from plastic.

13. The hit pin according to claim 11 in combination with a wheel as recited in the preamble of claim 9, said shoulders cooperatively capturing one of the wheel side walls and the hit pin end remote from the head extending into the other wheel side wall.

14. The hit pin according to claim 13 wherein the hit pin end remote from the head extends entirely through the other wheel side wall.

15. A method of assembling an elongate hit pin to a wheel of the type having an annular surface for engaging and rolling against a surface along which a distance is to be measured and first and second deformable annular side walls each having a thickness, said method comprising the steps of:

boring an axially extending opening through one of the side walls;

providing an elongate hit pin with a body having first and second enlargements therein defining first and second facing shoulders; and pressing the hit pin body lengthwise through the one side wall opening sufficiently that the first enlargement is pressed through the one side wall opening and the one side wall is captured cooperatively by the first and second shoulders and the hit pin is pressed against the other side wall to stabilize the position of the hit pin.

16. The method according to claim 15 wherein the hit pin body has a first generally uniform diameter, the first and second enlargements have a second diameter that is greater than the first diameter, and the opening in the one side wall has a third diameter that is less than the first diameter so that the body is squeezed into the one side wall opening and the one side wall deforms to permit passage of the first enlargement therethrough.

17. A method of assembling an elongate hit pin to a wheel of the type having an annular surface for engaging and rolling against a surface along which a distance is to be measured and first and second deformable annular side walls each having a thickness, said method comprising the steps of:

boring an axially extending opening through one of the side walls and at least partially through the other of the side walls in alignment with the opening through the one side wall;

providing an elongate hit pin with a body having first and second enlargements thereon defining first and second facing shoulders;

pressing the hit pin body lengthwise through the one side wall opening into the opening in the other of the side walls to stabilize the pin placement sufficiently that the first enlargement is pressed through the one side wall opening and the one side wall is captured cooperatively by the first and second shoulders.

18. A method of assembling an elongate hit pin to a wheel of the type having an annular surface for engaging and rolling against a surface along which a distance is to be measured and first and second deformable annular side walls each having a thickness, said method comprising the steps of:

boring an axially extending opening through one of the side walls;

providing an elongate hit pin with a body having first and second enlargements thereon defining first and second oppositely facing shoulders; and pressing the hit pin body lengthwise through the one side wall opening sufficiently that the first enlargement is pressed through the one side wall opening and the one side wall is captured cooperatively by the first and second shoulders, wherein the hit pin is made at least partially from a polytetrafluoroethylene resin material.

19. A wheel for a measuring device of the type having a frame, a distance counter having an actuating lever and mounted on the frame, and means for mounting the wheel on the frame for rotation above an axis, said wheel comprising:

an annular surface for engaging and rolling against a surface along which a distance is to be measured;

first and second annular side walls spaced axially with respect to the wheel axis and connected to said annular surface, each said side wall having a thickness in an axial direction;

a hit pin; and means for securing the hit pin to the wheel so that a part of said hit pin projects axially from one of said side walls to engage and operate the actuating lever on a counter as an incident of said wheel rotating relative to the frame, said hit pin having an elongate body and extending fully through said first side wall, said securing means including cooperating means on said second side wall and hit pin for holding said hit pin in an operative position on said wheel.

20. The wheel for a measuring device according to claim 19 including means on said hit pin for captively engaging said first wall on axially opposite sides thereof.

* * * * *